June 15, 1943.  A. F. KLASING  2,321,685
YIELDABLE BRACKET MEANS FOR THE LOWER UNIT OF A RAILWAY CAR BRAKE
Filed Aug. 28, 1941  3 Sheets-Sheet 1
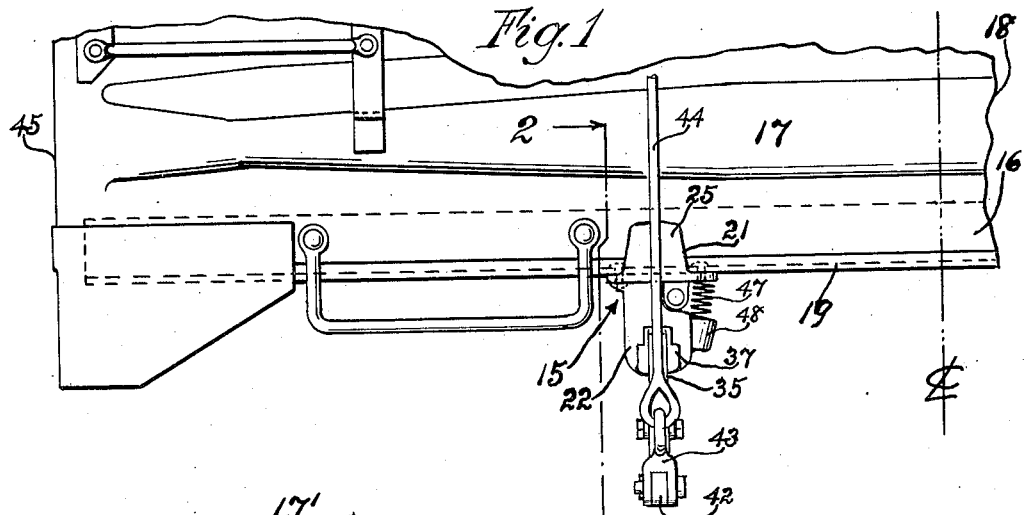
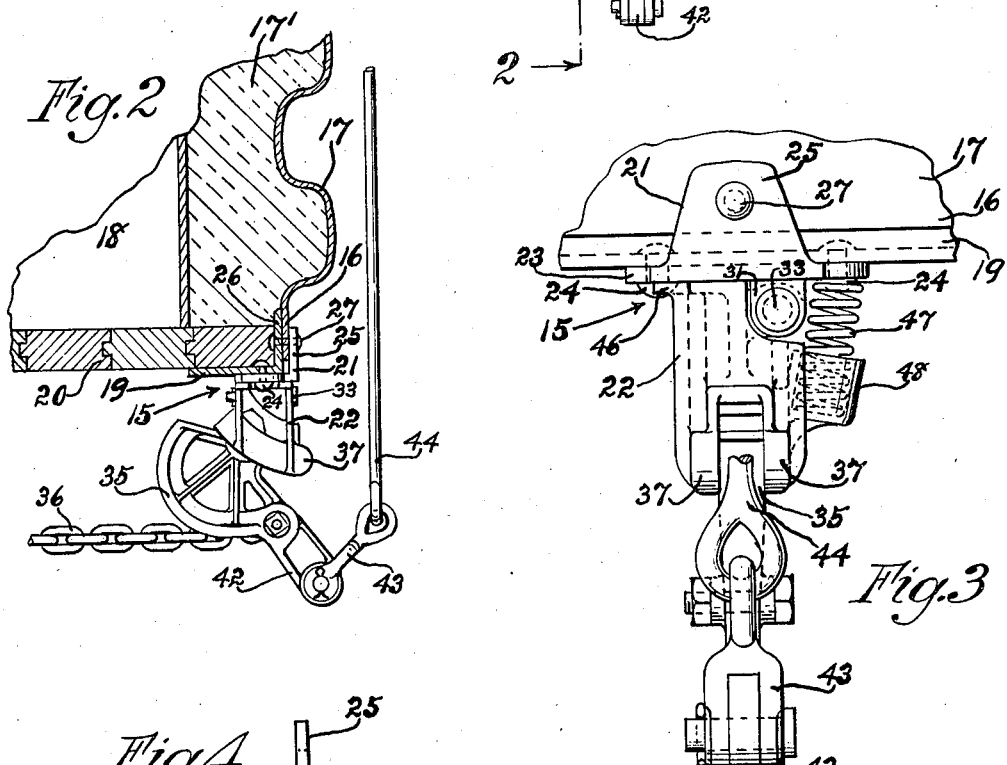
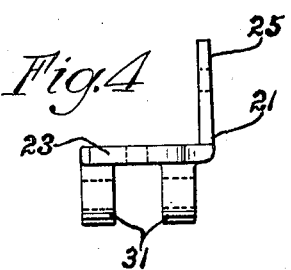
Inventor
Augustus F. Klasing
by J. Daniel Stuwe
Attorney June 15, 1943. A. F. KLASING 2,321,685
YIELDABLE BRACKET MEANS FOR THE LOWER UNIT OF A RAILWAY CAR BRAKE
Filed Aug. 28, 1941 3 Sheets-Sheet 2
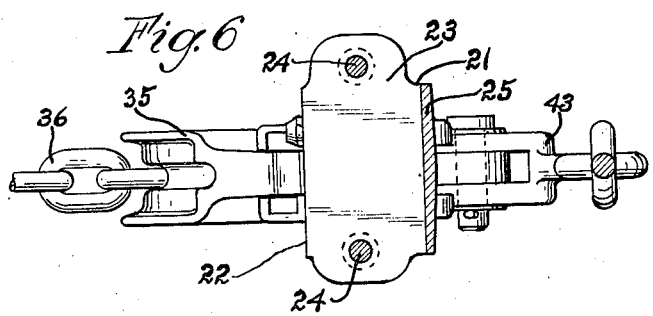
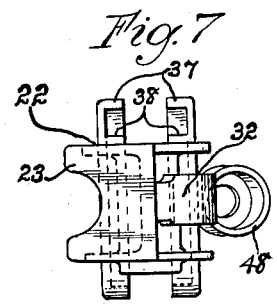
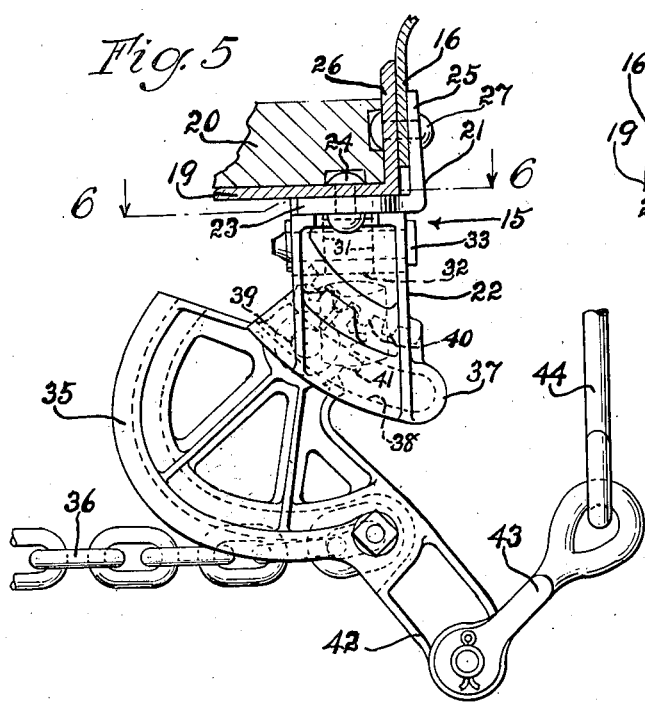
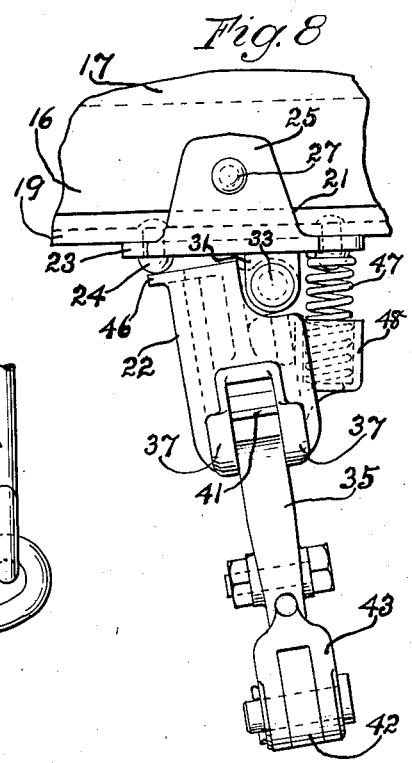
Inventor
Augustus F. Klasing
by J. Daniel Stuwe
Attorney.

June 15, 1943. A. F. KLASING 2,321,685
YIELDABLE BRACKET MEANS FOR THE LOWER UNIT OF A RAILWAY CAR BRAKE
Filed Aug. 28, 1941 3 Sheets-Sheet 3
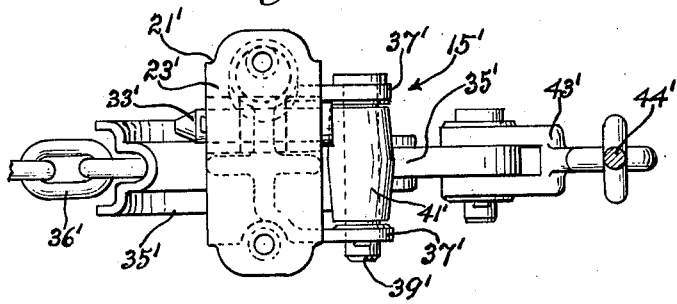
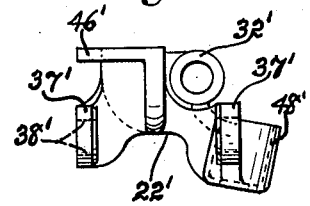
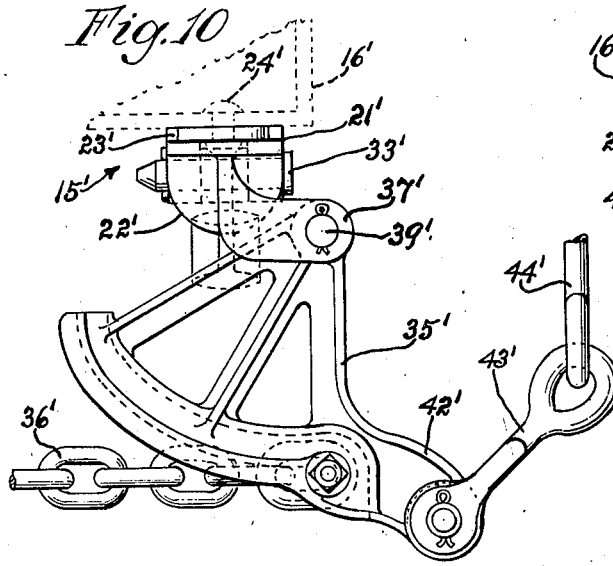
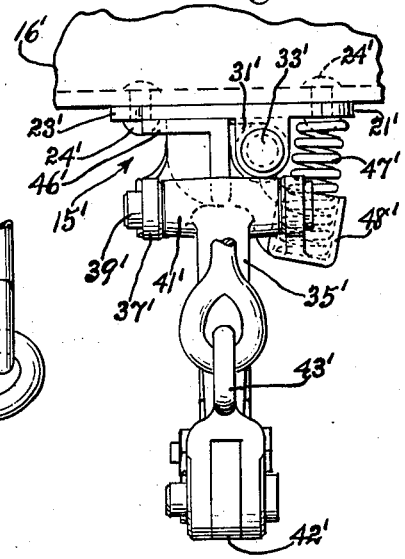
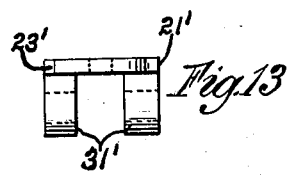
Inventor
Augustus F. Klasing
by J Daniel Stuwe
Attorney.

Patented June 15, 1943

2,321,685

UNITED STATES PATENT OFFICE 2,321,685

YIELDABLE BRACKET MEANS FOR THE LOWER UNITS OF RAILWAY CAR BRAKES

Augustus F. Klasing, Joliet, Ill.

Application August 28, 1941, Serial No. 408,644

12 Claims. (Cl. 188—205)

This invention relates to a new and useful yieldable bracket means for the lower unit of a railway car brake.

There are certain requirements of the Interstate Commerce Commission and of the American Association of Railroads that must be complied with by the brakes, and more especially the hand brakes, for the railway cars, as to power, location, take-up or travel of the brakes, etc.; and in the brake mechanisms which are now in use or on the market, especially in the power-hand brake mechanisms, the lower unit thereof, which comprises the bell crank or lower brake member that actuates the brake chain and also comprises the fulcrum or bracket which is secured to the car and supports said crank or member, is occasionally subjected to damage causing delays and expensive repairs, in view of extreme swinging movement of the car truck or wheels while travelling on sharp curves or upon derailment, the wheels thereby striking and breaking parts of this lower brake unit and especially the fulcrum or bracket thereof. The breaking of such fulcrum or bracket means then necessitates the removal of the rivets or bolts with which it is secured to the end sill or lower end means of the car; and this usually further requires the removal of some flooring in the modern railway car, to reach such rivets; and in each case that causes considerable expense and costly delay in repairing or replacing such broken fulcrum or bracket means.

It is my chief object and purpose with this invention to remedy such defects and difficulties, and to provide a novel and highly efficient fulcrum or bracket means for use in such lower brake unit of a railway brake mechanism, which fulcrum or means will have the outer part, the part that might be hit by a car wheel, arranged so as to be yieldable or suitably movable with relation to the inner part thereof that is secured to the car body; whereby to entirely overcome any breaking of said inner part that is secured to the car, and thus to avoid any need of long delays and expensive repairs as have here-to-fore been caused to the prior fulcrums now in use.

Another object of this invention is to provide such fulcrum or bracket means for the lower unit of a railway car brake which comprises a compact inner or upper part fixed to the car body which part is relatively strong, and an outer or lower part detachably mounted thereon and which is not as strong as the fixed part; so that an excessively swinging car wheel which might strike said outer part, might damage it but not the inner part; and such damaged outer part may then be readily removed from the fixed inner part and be repaired or replaced without much expense or delay.

A further object of this invention is to provide such a fulcrum or bracket means which embodies the several advantageous features, and comprises a relatively compact and strong upper part that is fixed to the car, out of reach of any car wheel, and an outer or lower companion part which is yieldably carried thereby, and is also of weaker material than said fixed part and is removable therefrom; so that it will be yieldable on the fixed part if struck, and may also be readily removed from the stronger fixed part and replaced, while the latter can remain mounted on the car.

These and various other objects and advantages are attained with this invention, as will become apparent from the following description, taken in connection with the accompanying drawings wherein the invention is shown in a few of the various desirable forms, it being evident that other arrangements and forms of construction may be adopted in carrying out the objects and purposes of this invention.

In the drawings:

Fig. 1 is a partial elevational view of an end of a railway car having my invention applied thereto.

Fig. 2 is a cross-sectional view thereof, taken on line 2—2 of Fig. 1.

Fig. 3 is an end elevational view of my invention mounted on the lower end of a car, and shown on a larger scale than in Fig. 1.

Fig. 4 is a side elevational view of the inner or upper part of my novel bracket means, which will be secured to the car.

Fig. 5 shows this invention in side elevation, mounted in its operative position on the lower end part of the car.

Fig. 6 is a top plan view thereof partly in section, taken on line 6—6 of Fig. 5.

Fig. 7 is a top plan view of the yieldable outer or lower part of this bracket means.

Fig. 8 is an end elevational view, like that in Fig. 3, but showing the yieldable lower part along with the bell crank thereon swung laterally on the upper fixed part, toward the center of the car.

Fig. 9 is a top plan view of a modified form of this invention, wherein the fixed part of the bracket has the end flange omitted, and the lower yieldable bracket part supports the bell crank by a pivot instead of ratchet means or a rolling fulcrum.

Figs. 10 and 11 are side and end elevational views thereof, respectively.

Fig. 12 is an end elevational view of the yieldable bracket part; and

Fig. 13 is a side elevational view of the fixed part.

In the drawings my invention is disclosed in a few of the most desirable forms of construction, being adapted for use in the lower brake unit of a railway car brake mechanism; and in each form this invention is composed of an inner or upper bracket part which is to be fixedly secured to the car body, and is preferably of relatively compact and strong construction; and an outer or lower companion bracket part which is yieldably carried by the fixed part to normally depend or extend therefrom away from the car, and is preferably of weaker construction, and is arranged to have operatively mounted thereon the bell crank or lower brake member whereby the brake chain is actuated.

This novel compound fulcrum or bracket means is shown in Figs. 1 to 8 as employed for mounting thereon a bell crank or lower brake member which utilizes a rolling fulcrum; while in Figs. 9 to 13 it is shown as employed for mounting such a bell crank or brake member which uses the customary pivot means. The bracket means will likewise be adapted for the various types of lower brake members used in the lower unit of railway car brake mechanisms.

In Figs. 1 to 8 of the drawings I have shown this invention in the form of a novel fulcrum or bracket means 15, mounted on the lower edge part 16 of the end wall 17 of a railway car 18, and being secured to the end sill or bar 19 of the floor 20, beneath said end sill and the insulation 17' of the wall, as the wall of a refrigerator car.

This bracket means 15 comprises a relatively flat and compact inner or upper bracket part 21, and an outer or lower bracket part 22 which is yieldably carried by said part 21 and normally depends or extends therefrom away from the edge part of the car. Said part 21 is preferably made of relatively strong material and construction, such as cast steel; while the companion part 22, which extends or depends therefrom into a more exposed position, is made of a weaker and more readily breakable or bendable material and construction, such as malleable metal; so that if it is accidentally struck, by the extreme swinging of a car wheel or the like, as on a sharp curve or by derailment, then said lower part 22 is enabled to yield or move, and it may even be bent or broken; but the stronger upper part 21, which is secured to the car, will remain intact and uninjured, while the lower part can then be readily removed and replaced.

The bracket part 21 comprises chiefly a flat top plate 23, which is suitably apertured to be secured underneath the edge part 16 of the car, being shown herein as secured to the end sill 19, by the use of rivet means 24. Said part 21 may also include a flange 25 extending vertically from plate 23, as shown in the form disclosed in Figs. 1 to 8, to extend upwardly against said edge part 16, being then also secured to the vertical flange part 26 of the sill 19, as shown by rivet means 27; or it may have such vertical flange omitted, as shown by the flangeless plate 23' of the bracket part 21' of the form disclosed in Figs. 9 to 13. The use or omission of such flange will depend on the particular shape of wall 17 and its lower edge part 16 of the car.

The lower bracket part 22 is yieldably carried by the fixed part 21, and it depends therefrom, extending away from the edge part 16 of the car; and it is herein shown as being swingably and detachably mounted on said fixed part 21. Such yielding movement is shown as being provided by pivotally connecting these two bracket parts 21 and 22, by the use of apertured lug means 31 on said part 21, and cooperating apertured lug means 32 on said part 22, and a pin 33 extending thru the apertures and retained by a cotter pin or the like; so that said part 22 is readily yieldable or swingable on part 21, if it should be accidentally struck.

This bracket part 22 is provided with suitable means whereby to support the lower brake member 35 operably thereon, said member being herein shown in the shape of a bell crank, but may be of any suitable shape; and it has the brake chain 36 connected thereto and actuated thereby. Said supporting means on this part 22, in the form shown in Figs. 1 to 8, includes a pair of spaced curved jaws 37 having groove means 38 therein in which travel the trunnions 39 provided on said bell crank 35. A ratchet portion 40 is provided between these jaws 37, whereon travels the ratchet segment 41 provided on said bell crank, the latter having its outer part or arm 42 connected by a link 43 with the usual operating rod 44, which is connected with the suitable and well known hand operated brake applying member (not shown).

This form of bracket means is thus arranged and constructed to provide rotary and translatory movement or a rolling movement to this bell crank form of lower brake member 35, upon operation of said rod 44 thru the operation of the brake applying member.

It should be noted that this bracket means and the connected elements of this lower unit of such car brake mechanisms are mounted toward one side of the center line CL of the car, as indicated in Fig. 1, and as is customary with such railway car hand-brakes; and that consequently said lower unit is endangered only by the car wheel of the adjacent side 45 of the car; and furthermore, that the lower part 22 under normal conditions depends or extends straight downwardly or away from part 21 and from the car, as shown in Fig. 3. It should further be noted that the lug means 31 and 32 with the pivot pin 33 are placed off center of the vertical or longitudinal axis thru said part 22 and the unit, being positioned from said axis toward the center line CL of the car; and that said part 22 is provided with a stop shoulder 46 which normally engages against the part 21; and consequently that this part 22 will thereby be held in its proper depending position while force is applied to the brake member 35 thru operation of the brake mechanism, and that it normally will thus depend due to the force of gravity and applied power together with function of spring 47.

The bracket part 22 of this bracket means is thus rendered yieldable or swingable on its pivot 33, away from the adjacent car wheel under said side 45 and toward the center line CL of the car. However, to make sure that said part 22 with the brake member 35 supported thereon will be retained firmly in the proper depending position, as during swaying of the car, etc., I have further provided resilient means in connection with these two parts 21 and 22 to hold the latter in such proper position. Said resilient means is shown in the form of a coil spring 47 seated with its lower end in a cup 48 provided on the part 22, and with its upper end it bears against part 21, around the rivet 24, as shown in Fig. 3; and as this spring is placed under compression in this position, it will forcefully retain said bracket part 22 in proper depending position, but will permit swinging of said part and depression of said spring when forced by external means.

In Figs. 9 to 13 I have illustrated this invention in a modified form of construction, wherein the bracket means 15' comprises an upper fixed part 21', which is compact and of relatively strong material, and a lower part 22' yieldably carried thereby and depending therefrom and being weaker or of a more readily breakable or bendable material. Herein the top plate 23' of the upper bracket part 21' is without any vertical flange, and said plate is secured by rivet means 24' underneath the lower end part 16' of the car. The plate is provided with depending lug means 31' which cooperate with lug means 32' provided on the lower bracket part 22', and a pin 33' extends therethru, thus providing the yielding or swinging movement of part 22' on part 21', as in the above described form.

In this modified form the lower bracket part 22' is adapted for supporting a lower brake member or bell crank 35' which is provided with a pivotal connection; and this part 22' therefore has its spaced jaws 37' provided with apertures 38', and therethru extends a pivot pin 39' which passes thru a sleeve 41' provided on said member or bell crank 35'. The brake chain 36' is connected to said member 35', and the operating rod 44' is connected thru link 43' to arm 42' on said member 35', in the usual manner and like in the preceding form.

As best seen in Fig. 11, the pivot pin 33' herein is also offset from the vertical axis thru bracket means 15', and a spring 47' is seated in a cup 48' provided on part 22' and against part 21' on rivet 24', thereby holding stop shoulder 46' firmly pressing against part 21', and thus retaining the lower part 22' in its proper depending position under the usual normal conditions.

It is apparent from the above disclosure that with this novel construction of yieldable fulcrum or bracket means, employed in the lower unit of a railway car brake for supporting the bell crank or lower brake member that actuates the brake chain, I do fully avoid the formerly occurring trouble caused by breakage of the usual and known fulcrums of this type; and that with this invention the lower or protruding bracket part, if accidentally struck, will hereby be enabled to yield or swing; and even if such protruding part should be struck and broken it can be readily removed from the fixed part and replaced, thus still obviating any troublesome and time delaying removal of the bracket part that is fixed to the car.

I claim:

1. In a railway car brake mechanism having a lower unit positioned at the lower end part of the car and including a lower brake actuating member and means attached thereto and extending therefrom to an upper unit whereby to operate said member, a bracket device for supporting said member and including companion bracket portions one of which is secured firmly to the lower part of the car and another of which is carried yieldably by said secured portion and positioned to normally depend therefrom but to be yieldable thereon if accidentally struck by a wheel of the car, and means on said yieldable portion for operably supporting said lower member thereon.

2. In a railway car brake mechanism having a lower unit including a lower brake actuating member, a bracket device comprising a relatively strong and compact bracket portion containing a flat part firmly secured under the floor part of the car and also a companion bracket portion of weaker construction than said secured portion, being mounted on the latter to normally depend therefrom but to be yieldable thereon if struck by a wheel of the car and also to be readily detachable therefrom for repairs, and means on said yieldable portion for operably supporting said lower member thereon.

3. In a railway car brake mechanism comprising flexible brake means beneath the car and also a lower unit at the lower end part of the car including a lower brake member whereby the flexible brake means is actuated, a bracket device comprising a pair of companion bracket portions one of which includes a lower part having an upwardly projecting flange part thereon whereby it fits and is secured to the lower end part of the car and the other of which is yieldably mounted on the secured portion to normally extend therefrom and includes means to provide a fulcrum support for said lower member, whereby to avoid damage to the secured portion and also to the yieldable portion if the latter is accidentally struck.

4. In a railway car brake mechanism having a lower unit including a lower brake actuating member, a fulcrum device comprising companion bracket portions one of which is secured firmly to the lower part of the car and another of which is mounted yieldably on said secured portion and is provided with means for operably supporting said brake actuating member to have rolling movement thereon longitudinally of the car, and means to urge the yieldable portion to its proper extended position but permit yielding thereof on the secured portion if struck.

5. In the lower unit of a railway car brake mechanism including a brake chain actuating member, a bracket device comprising a relatively strong and compact bracket portion arranged to be secured against the car floor at the lower end part of the car, and a companion portion of weaker construction yieldably carried by said secured portion and yieldably held to extend therefrom away from said end part, but to enable it to swing thereon under certain conditions, and means on the outer part of said yieldable portion for operably supporting said chain actuating member thereon.

6. In the lower unit of a railway car brake mechanism including a bell crank, a fulcrum device whereby to mount the bell crank on a railway car, said device comprising a compact and relatively flat bracket portion arranged to be secured underneath the lower part of the car, and a companion bracket portion swingably mounted thereon to normally depend therefrom and provided with means whereby to operably support said bell crank.

7. In the lower unit of a railway car brake mechanism including a brake chain actuating member, a bracket device for supporting the brake-chain actuating member on a railway car, said device comprising a relatively flat and compact bracket portion arranged to be secured firmly underneath the floor part of the car, a companion bracket portion swingably and detachably mounted on said secured portion to be readily removable if injured, means on the swingable portion for operably supporting said brake-chain actuating member, and means on said two portions for resiliently urging the swingable portion to its proper position but enable it to yield if accidentally struck.

8. In the lower unit of a railway car brake mechanism including a bell crank, a bracket device whereby to mount the bell crank on a railway car, said device consisting of a compact upper bracket portion arranged to be secured to the lower end part of the car and also a companion lower bracket portion which is pivotally and detachably mounted on said upper portion, to be swingable thereon if accidentally struck and also to be readily removable therefrom for repairs if damaged, means on the lower portion for operably supporting the bell crank, and means, including stop means and a spring, associated with said two portions for normally retaining the lower portion in a depending position but enable it to yield if accidentally struck.

9. In the lower unit of a railway car brake mechanism including a bell crank, a bracket device whereby to mount the bell crank on a railway car, said device comprising an upper bracket portion arranged to be secured to the lower part of the car and also a companion lower bracket portion which is mounted by offset pivot means on said secured portion so as to normally depend therefrom but to be swingable thereon, means on the lower part of said swingable portion for supporting the bell crank operably thereon, stop means to limit the movement of the swingable portion in one direction beyond its proper depending position, and resilient means to normally retain said swingable portion in its depending position and against said stop means, but enable it to swing in the opposite direction if accidentally struck, whereby to prevent breaking of said secured portion.

10. The subject matter set forth in claim 9, and wherein the pivot means and the swingable portion are readily removable from the secured portion, to provide for repairs if damaged or broken.

11. In the lower unit of a railway car brake mechanism including a chain actuating member, a compound bracket device whereby to mount the chain actuating member on a railway car, said device consisting of an upper bracket portion and a companion lower bracket portion, whereof the upper portion is relatively strong and compact and arranged to be secured to the lower part of the car and the lower part has jaw means for operatively supporting said member, pivot means for swingably mounting the lower portion on the upper one to normally depend therefrom, stop means to limit the swinging movement of the lower portion in one direction, and spring means held under tension between means on said two portions for normally retaining the swingable portion in its depending position and limited by the stop means, but enable it to swing in the opposite direction if accidentally struck.

12. The subject matter set forth in claim 11, and wherein the pivot means and the swingable portion are readily removable from the upper secured portion, to provide for convenient replacement, and said lower portion is of weaker construction and material than said upper one, to obviate any chance if it is struck to also break the upper one.

AUGUSTUS F. KLASING.